(12) United States Patent
Dick et al.

(10) Patent No.: US 8,442,105 B1
(45) Date of Patent: May 14, 2013

(54) EQUALIZATION FOR MINIMUM MEAN-SQUARE-ERROR SUCCESSIVE-INTERFERENCE-CANCELLATION

(75) Inventors: Christopher H. Dick, San Jose, CA (US); Raghavendar M. Rao, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 30 days.

(21) Appl. No.: 13/287,943

(22) Filed: Nov. 2, 2011

(51) Int. Cl.
*H03H 7/30* (2006.01)
*H03H 7/40* (2006.01)
*H03K 5/159* (2006.01)

(52) U.S. Cl.
USPC .......... 375/232; 375/229; 375/233; 375/260; 375/270; 375/347; 375/348

(58) Field of Classification Search .................. 375/229, 375/232, 233, 260, 267, 347, 348
See application file for complete search history.

(56) References Cited

U.S. PATENT DOCUMENTS

| | | | |
|---|---|---|---|
| 2007/0155336 A1* | 7/2007 | Nam et al. | 455/69 |
| 2007/0206626 A1* | 9/2007 | Lee et al. | 370/437 |
| 2008/0056305 A1* | 3/2008 | Medvedev et al. | 370/491 |

OTHER PUBLICATIONS

Amiri, K., et al., "Reduced Complexity Soft MMSE MIMO Detector Architecture", SDR'10 Technical Conference and Product Exposition, Nov. 30-Dec. 3, 2010 pp. 1-5, Hyatt Regency Crystal City, Washington, DC.

Kim, H.S., et al., Research Article, "A Practical, Hardware Friendly MMSE Detector for MIMO-OFDM-Based Systems", EURASIP Journal on Advances in Signal Processing, Feb. 19, 2008, pp. 1-17, vol. 2008.

Lu, B., et al., "Performance Analysis and Design Optimization of LDPC-Coded MIMO OFDM Systems", IEEE Trans, Signal Processing, vol. 52, No. 2, pp. 348-361, Feb. 2004.

Tuchler, M., et al., Minimum Mean Squared Error Equalization Using a Prior Information, IEEE Trans. Signal Processing, vol. 50, No. 3, pp. 673-683, Mar. 2002.

Valenti, M., "Iterative Solutions Coded Modulation Library Theory of Operation", Oct. 5, 2005, pp. 1-106, West Virginia University, Morgantown, WV.

* cited by examiner

*Primary Examiner* — Ted Wang
(74) *Attorney, Agent, or Firm* — W. Eric Webostad (57) ABSTRACT

In an embodiment of an equalizer, a demodulator for MMSE-SIC receives a symbol vector to provide first information. A decoder receives the first information to provide second information to the demodulator. The decoder iteratively processes the first information to provide the second information. The demodulator and decoder are coupled in a loop for feeding back the second information for iteratively refining the first information. A detection-cancellation block of the demodulator receives the symbol vector to provide an equalized vector. A channel pre-processor block of the demodulator receives an initial vector output of the detection-cancellation block for the symbol vector for a demodulating-decoding iterative sequence to provide a weight vector. The channel pre-processor block provides an approximation using a fixed matrix to generate the weight vector. The detection-cancellation block receives the weight vector for equalization of the symbol vector in order to provide the equalized vector.

20 Claims, 5 Drawing Sheets

EQUALIZATION FOR MINIMUM MEAN-SQUARE-ERROR SUCCESSIVE-INTERFERENCE-CANCELLATION

FIELD OF THE INVENTION

An embodiment of the invention relates to integrated circuit devices ("ICs"). More particularly, an embodiment of the invention relates to an equalizer for minimum mean-square-error successive-interference-cancellation ("MMSE-SIC") for an IC.

BACKGROUND

Integrated circuits have become more "dense" over time, i.e., more logic features have been implemented in an IC of a given size. Additionally, with respect to an IC having a pool of programmable resources, such as a Programmable Logic Devices ("PLD") for example, more complex circuit designs have led to more demand for such programmable resources. Therefore, power consumption has become an increasingly more significant issue.

One area where power consumption by an IC has become an increasingly more significant issue is in multiple-input multiple-output ("MIMO") orthogonal frequency-division multiplexing ("OFDM") systems for high data rate wireless communication. Power consumption for a base station in such MIMO OFDM systems is a significant issue.

Hence, it is desirable to provide an IC for reception in a MIMO OFDM system having reduced power consumption.

SUMMARY

One or more embodiments generally relate an equalizer for minimum mean-square-error successive-interference-cancellation ("MMSE-SIC") for an IC.

An embodiment relates generally to an equalizer. In such an embodiment, a demodulator is to receive a symbol vector. The demodulator is for minimum mean-square-error successive-interference-cancellation ("MMSE-SIC") to provide first information. A decoder is to receive the first information to provide second information to the demodulator. The decoder includes a first loop for internally iteratively processing the first information to provide the second information as a refined estimate of the first information. The demodulator and the decoder are coupled to provide a second loop for feeding back the second information for iteratively refining the first information. The demodulator includes: a detection-cancellation block to receive the symbol vector to provide an equalized vector; and a channel pre-processor block to receive an initial vector output of the detection-cancellation block for the symbol vector for a demodulating-decoding iterative sequence to provide a weight vector. The channel pre-processor block provides an approximation using a fixed matrix to generate the weight vector. The detection-cancellation block receives the weight vector for equalization of the symbol vector in order to provide the equalized vector.

Another embodiment relates generally to another equalizer. In such an embodiment, a demodulator receives a symbol vector. The demodulator is for minimum mean-square-error successive-interference-cancellation ("MMSE-SIC") to provide first extrinsic information. A decoder receives the first extrinsic information to provide second extrinsic information to the demodulator. The decoder includes a first loop for internally iteratively processing the first extrinsic information to provide the second extrinsic information as a refined estimate of the first extrinsic information. The demodulator and the decoder are coupled to provide a second loop for iteratively feeding back the second extrinsic information for refining the first extrinsic information. The demodulator includes a log-likelihood-ratio ("LLR") determination block to receive an equalized vector to provide the first extrinsic information, where the LLR determination block has a log map to provide an approximation of a Wang Algorithm.

Yet another embodiment relates generally to a method for operation of an equalizer. In such an embodiment, a symbol vector is obtained. One or more iterations around a loop formed with a demodulator for minimum mean-square-error successive-interference-cancellation ("MMSE-SIC") coupled to a decoder are performed to process the symbol vector obtained. Detected-decoded bits of the symbol vector are output from the decoder after the one or more iterations for the MMSE-SIC. An initial iteration around the loop for a demodulating-decoding iterative sequence includes: determining symbol averages for symbols of the symbol vector; generating a cancellation vector using the symbol averages; performing interference cancellation on the symbol vector using a channel matrix and the cancellation vector to obtain a revised symbol vector; determining MMSE weights using a fixed matrix to provide a weight vector; and equalizing the revised symbol vector with the weight vector to provide an equalized vector.

BRIEF DESCRIPTION OF THE DRAWINGS

Accompanying drawings show exemplary embodiments in accordance with one or more aspects of the invention. However, the accompanying drawings should not be taken to limit the invention to the embodiments shown, but are for explanation and understanding only.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Before describing exemplary embodiments illustratively depicted in the several figures, a general introduction is provided to further understanding. A conventional demodulator may be significantly mathematically complex. Such a conventional demodulator is described in additional detail in an article entitled "Performance Analysis and Design Optimization of LDPC-Coded MIMO OFDM Systems" by Ben Lu, Guosen Yue, and Xiaodong Wang, IEEE TRANSACTIONS ON SIGNAL PROCESSING, Vol. 52, No. 2, February 2004, pages 348-361 ("Wang Demodulator"). However, such mathematical complexity generally means more circuit resources are used, which in turn means more power is consumed.

With the above general understanding borne in mind, various embodiments for an equalizer are described below. To reduce power consumption, a demodulator of such an equalizer uses significantly fewer circuit resources than a Wang Demodulator, and thus may consume significantly less power than a Wang Demodulator. From the following description, it will be understood that such reduction in resource utilization comes with a small performance loss, such as for example a performance loss of approximately 0.5 dB or less as compared with the more mathematically complex Wang Demodulator. Use of fewer circuit resources in addition to a reduction in power may also lead to a reduction in cost. Such reduction in power or cost may be applicable to any IC, including without limitation an Application Specific Integrated Circuit ("ASIC"), a Programmable Logic Device ("PLD") or any other IC having a pool of programmable circuit resources, an Application Specific Standard Product ("ASSP"), or a System-on-Chip ("SoC"). For example, an ability to use a smaller PLD, namely a PLD with fewer programmable circuit resources than a larger PLD, may likewise reduce cost.

Because one or more of the above-described embodiments are exemplified with a particular type of IC, a detailed description of such an IC is provided below. However, it should be understood that any IC may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
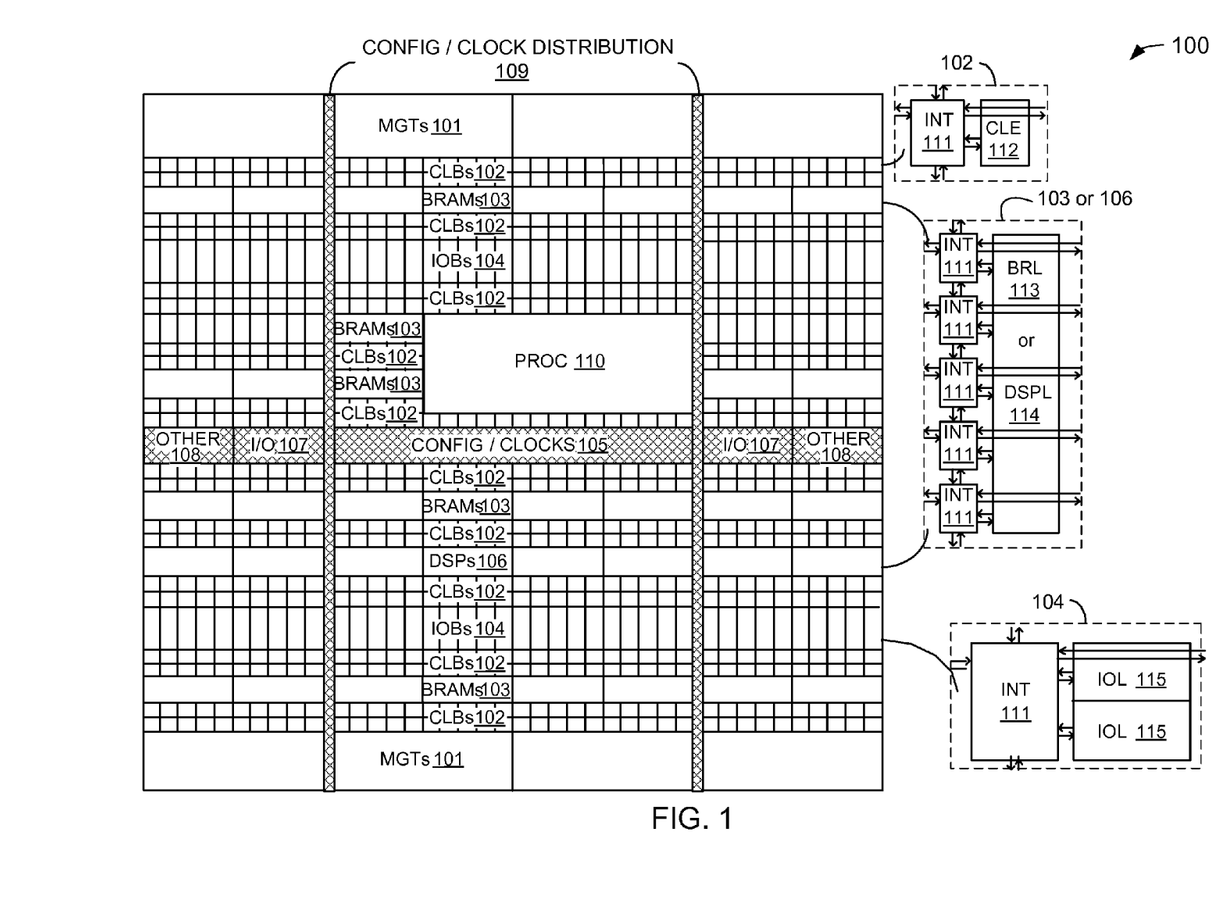
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
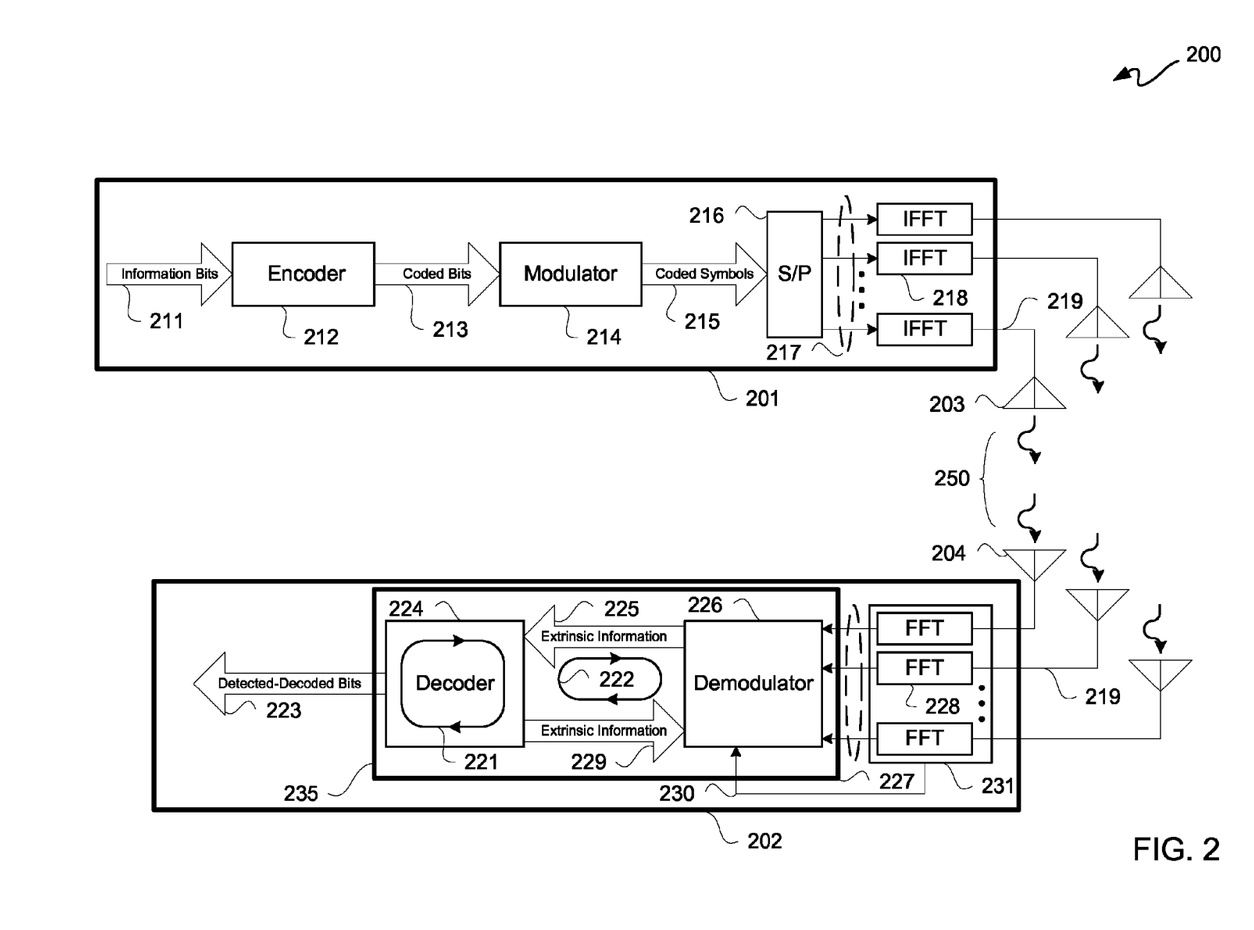
FIG. 2 is a block diagram depicting an exemplary embodiment of a multiple-input multiple-output ("MIMO") orthogonal frequency-division multiplexing ("OFDM") communication system.

FIG. 2 is a block diagram depicting an exemplary embodiment of an MIMO OFDM communication system 200. MIMO OFDM communication system 200 includes a transmitter 201 and a receiver 202. Transmitter 201, as well as antenna array 203, may be associated with one base station, and receiver 202, as well as antenna array 204, may be associated with another base station, where data or other information 250 may be communicated over-the-air from transmitter 201 to receiver 202.

With reference to transmitter 201, information bits 211 may be provided to an encoder 212 for channel coding. In this embodiment, a Turbo encoder 212 is used; however, in another embodiment a different type of encoder may be used for encoding information bits 211 for transmission. For purposes of clarity by way of example not limitation, it shall be assumed that a Turbo code is used; however, it should be understood that in other embodiments a low-density parity check ("LDPC") code or other error-control code may be used.

Turbo encoder 212 encodes information bits 211 to output coded bits 213 to modulator 214 for mapping to symbols. Such coded bits 213 may be interleaved prior to modulation by modulator 214, though not illustratively shown for purposes of clarity and not limitation. In this embodiment, an M phase-shift-keyed ("MPSK") modulator 214 is used for M a positive integer, where such modulation is assumed to be for an M quadrature amplitude modulation ("MQAM") constellation for this embodiment. MPSK modulator 214 modulates coded bits 213 to output coded symbols 215 to serial-to-parallel converter ("S/P") 216. S/P 216 demultiplexes coded symbols 215 into parallel streams 217 to a corresponding number of Inverse Fast Fourier Transform ("IFFT") blocks 218. Parallel streams 217 are transformed by IFFT blocks 218 into corresponding radio frequency ("RF") signals 219 for respective antennas of antenna array 203 for transmission. RF signals 219 are spatially multiplexed streams sharing time and frequency resources, namely RF signals 219 are overlaid with one another in time and frequency. Other known details regarding transmitter 201 are not described for purposes of clarity and not limitation.

RF signals 219 are received by antennas of antenna array 204 coupled to receiver 202. The number of antennas in antenna array 204 may be equal to or different from the number of antennas in antenna array 203. For this embodiment, it may be assumed that MIMO OFDM communication system 200 is a spatial multiplexing MIMO OFDM system with correlated channels. Received RF signals 219 are respectively provided as input to FFT blocks 228 of an RF front end/channel and signal-to-noise ratio ("SNR") estimator block 231. Generally, FFT blocks 228 provide parallel bitstreams, which collectively provide a symbol vector 227 input to demodulator 226, at a baseband frequency. A channel matrix, H, and an SNR estimate ("H/SNR") 230 associated with RF signals 219 may be input to demodulator 226 from RF front end/channel and estimator block 231. Other known details regarding RF front end/channel and signal-to-noise ratio ("SNR") estimator block 231 of receiver 202 have not been described for purposes of clarity and not limitation.

As previously indicated, a Wang Demodulator is significantly more mathematically complex than demodulator 226. Demodulator 226 uses significantly fewer circuit resources than such a Wang Demodulator, and thus demodulator 226 may consume significantly less power than a Wang Demodulator. As previously described, use of fewer circuit resources in addition to a reduction in power may also lead to a reduction in cost.

Demodulator 226 processes symbol vector 227 to provide extrinsic information ("first extrinsic information") 225 along a feed forward path to a channel decoder, such as decoder 224. Decoder 224 refines such first extrinsic information 225 to provide extrinsic information ("second extrinsic information") 229 along a feedback path to demodulator 226. Decoder 224 may have an inner loop ("first loop") 221 for internally iteratively processing first extrinsic information 225 to provide second extrinsic information 229, where such second extrinsic information 229 is provided as a refined estimate of such first extrinsic information 225 for an iteration of an outer loop ("second loop") 222. On a subsequent iteration of second loop 222, such second extrinsic information 229 may be processed by demodulator 226 for refining first extrinsic information 225 for such subsequent iteration. Accordingly, after an initial iteration, first extrinsic information 225 may be refined responsive to second extrinsic information 229 by demodulator 226. By internally iteratively processing first extrinsic information around first loop 221 of decoder 224, and by iteratively feeding forward first extrinsic information 225 and iteratively feeding back second extrinsic information 229 around second loop 222, decoder 224 may obtain a sufficiently refined estimate via first extrinsic information 225 to output "hard decisions," namely detected-decoded bits 223.

Decoder 224, which is a channel decoder, in an exemplary embodiment may be a Turbo decoder. Demodulator 226 may be what is referred to as a "soft" demodulator. In an exemplary embodiment, demodulator 226 is a "soft" MIMO-OFDM demodulator. More particularly, in such an embodiment, demodulator 226 may be a minimum mean-square-error ("MMSE") demodulator. Demodulator 226 and decoder 224 are coupled to provide second loop 222 for successive-interface-cancellation ("SIC"). When coupled in a loop, the loop configuration of demodulator 226 and decoder 224 may be referred to as an equalizer 235. Accordingly, equalizer 235 is for MMSE-SIC. For use of a Turbo code, namely for decoder 224 a Turbo decoder, equalizer 235 may be referred to as a Turbo equalizer for MMSE-SIC.

The terms "soft" and "extrinsic" as used herein refer to providing estimates, probabilities, or other values associated with likelihood. For example, demodulator 226 and decoder 224 may respectively be referred to as a soft demodulator and a soft decoder, as extrinsic information of coded bits is iteratively passed between soft-input-soft-output ("soft")

demodulator and soft decoder. Moreover, extrinsic information does not mean that such information is extraneous; rather, the phrase "extrinsic information" in the context of demodulator 226 and decoder 224 refers to providing estimates or values associated with likelihood of states of bits. More particularly, for equalizer 235 a Turbo equalizer for MMSE-SIC, "extrinsic information" refers to log-likelihood-ratios ("LLRs").

Figure 3:
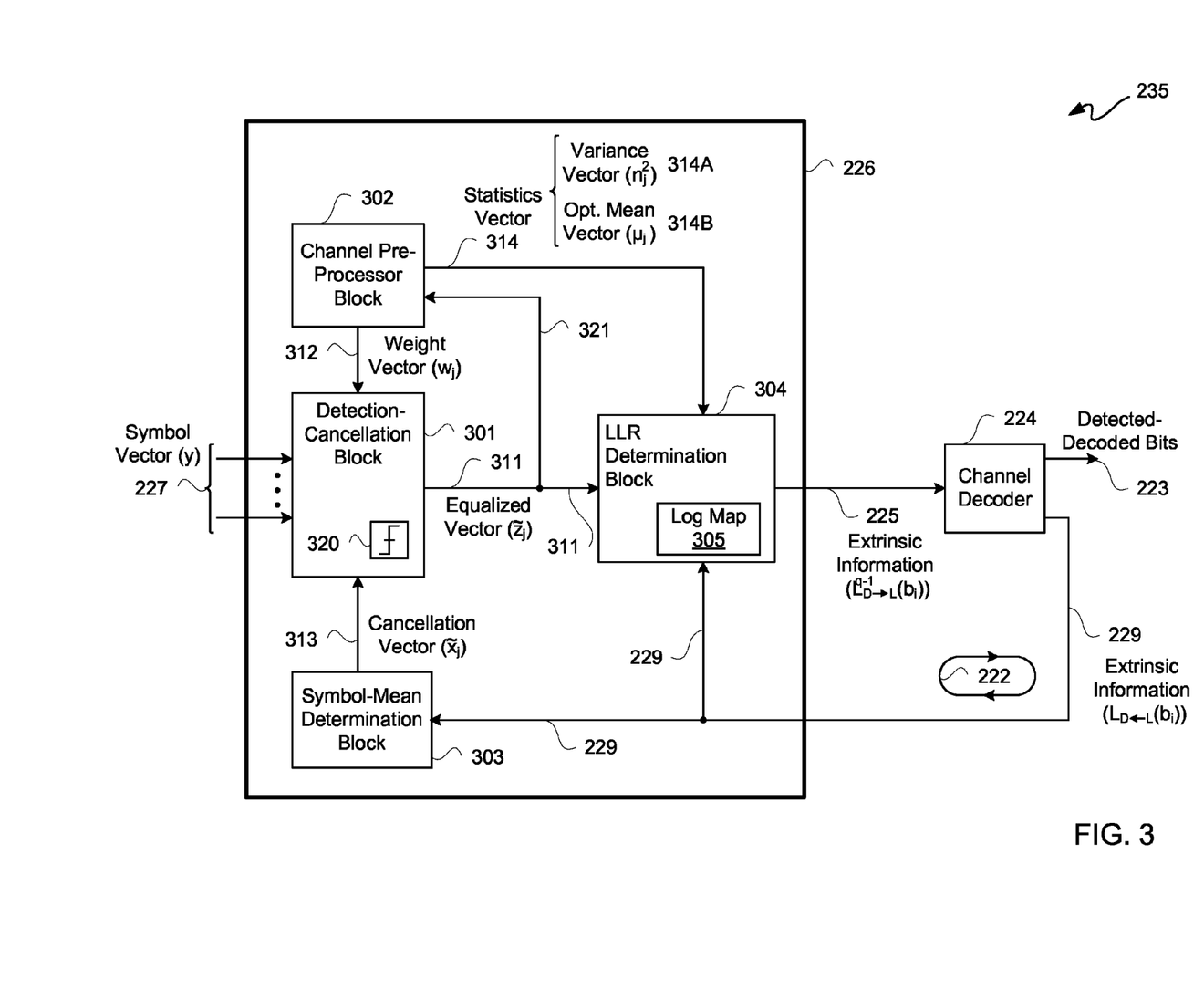
FIG. 3 is a block diagram depicting an exemplary embodiment of an equalizer.

FIG. 3 is a block diagram depicting an exemplary embodiment of an equalizer 235. Demodulator 226 includes detection-cancellation block 301, LLR determination block 304, channel pre-processor block 302, and symbol-mean determination block 303.

Detection-cancellation block 301 of demodulator 226 is coupled to receive symbol vector 227, cancellation vector 313, and weight vector 312 to provide equalized vector 311. Additionally, demodulator 226 is coupled to receive a channel matrix and an SNR, as previously described, but not shown in this FIG. 3 for purposes of clarity and not limitation. For purposes of clarity and not limitation, it shall be assumed that detection-cancellation block 301 is a MIMO detection-cancellation block, even though a Single-Input Single-Output ("SISO") detection-cancellation block may be used in another embodiment.

Generally, symbol-mean determination block 303 is configured to determine symbol means or averages. More particularly, symbol-mean determination block 303 may be configured to form a soft estimate of an expected value of a symbol $x_j$ transmitted via a transmit antenna j for j a positive integer as follows from Equation (1):

$$\tilde{x}_j \triangleq \sum_{\hat{x} \in \Omega} \hat{x} P(x_j = \hat{x}) = \sum_{\hat{x} \in \Omega} \hat{x} \prod_{l=1}^{\log 2|\Omega|} \left[ 1 + \exp(-\{\hat{x}\}_l) \cdot L_{D \leftarrow L}^{q-1}(b_{l,j}) \right]^{-1} \quad (1)$$

where $\Omega$ is a constellation size of a modulator and $b_{l,j}$ denotes an lth bit in symbol $x_j$. In Equation 1, superscript q indicates an iteration of second loop 222 in a demodulating-decoding iterative sequence; L denotes extrinsic information; and D denotes demodulator 226. A subscript D→L denotes quantities of first extrinsic information 225 passed from demodulator 226 to decoder 224, and a subscript D←L denotes quantities of second extrinsic information 229 passed from decoder 224 to demodulator 226. To prepare for SIC to be performed in parallel for all symbols y in a symbol vector 227, except symbol $y_j$, symbol-mean determination block 303 may be configured to output a cancellation vector 313, in a form of a transpose matrix, T, of the form in Equation (2):

$$\tilde{x}_j \triangleq [\tilde{x}_1, \ldots, \tilde{x}_{j-1}, 0, \tilde{x}_{j+1}, \ldots, \tilde{x}_{M_T}]^T \quad (2)$$

Detection-cancellation block 301 may be configured to performed soft interference cancellation in accordance with Equation (3):

$$\tilde{y}_j \triangleq y - H\tilde{x}_j = H(x - \tilde{x}_j) + n \quad (3)$$

where n is noise.

Channel pre-processor block 302 may be coupled to receive an initial vector output 321 of detection-cancellation block 301 for symbol vector 227 to provide a weight vector 312 for a demodulating-decoding iterative sequence. Reference number 321 is used to distinguish output of detection-cancellation block 301 from a filtered version of equalized vector 311 using weight vector 312. Using a priori information, cancellation vector 313 may be initially generated for such a demodulating-decoding iterative sequence to provide initial vector output 321 to channel pre-processor block 302.

Channel pre-processor block 302 in turn may generate weight vector 312 for input to detection-cancellation block 301. After filtering by filter 320 of detection-cancellation block 301, equalized vector 311 is provided to LLR determination block 304. Filter 320 may have a filter output of the form in Equation (4) to provide equalized vector 311:

$$z_j \triangleq w_j^H \cdot y_j \quad (4)$$

where an MMSE weight for antenna j, $w_j$, may be selected to minimize a mean-square error between transmit symbol $x_j$ and filter output $z_j$. Filter 320 may be what is referred to as "an instantaneous linear" MMSE filter. Channel pre-processor block 302 may be configured to determine weight vector 312 according to Equation (5):

$$w_j = \\ \mathrm{argmin}_{w \in C^M} E\{|x_j - w^H \tilde{y}_j|^2\} = \sqrt{\frac{M_T}{SNR}} \left( H\Delta_j H^H + \frac{M_T}{SNR} I \right)^{-1} \cdot H \cdot e \quad (5)$$

where $M_T$ is a number of transmit antennas; e is a vector with all zero entries except for the jth entry, and where covariance matrix $\Delta j$ is of the form in Equation (6):

$$\Delta_j \triangleq \mathrm{cov}\{x_j - \tilde{x}_j\} = \\ \mathrm{diag}\{1 - |\tilde{x}_1|^2, \ldots, 1 - |\tilde{x}_{j-1}|^2, 1, 1 - |\tilde{x}_{j+1}|^2, \ldots, 1 - |\tilde{x}_N|^2\} \quad (6)$$

In another embodiment, covariance matrix $\Delta j$ may be approximated by replacement with a fixed matrix to generate weight vector 312. For example, in an embodiment, covariance matrix $\Delta j$ may be replaced with an identity matrix, I, namely where I=diag$\{1_1, \ldots, 1_{j-1}, 1_j, 1_{j+1}, \ldots, 1N\}$. Thus, by replacing a covariance matrix $\Delta j$ with a fixed matrix, such as a diagonal matrix, fewer circuit resources are used due to simplification for determining MMSE weights, which in turn conservers power and may lower cost. Additionally, it should be understood that because a fixed matrix is used instead of a covariance matrix $\Delta j$, once determined, weight vector 312 does not change for a demodulating-decoding iterative sequence. For example, if a demodulating-decoding iterative sequence involved 3 iterations around second loop 222, then once initially determined, weight vector 312 would be the same, namely static, for all such iterations of such sequence. Of course, fewer or more than 3 iterations may be used for a demodulating-decoding iterative sequence, and weight vector 312 may be determined anew for each demodulating-decoding iterative sequence anew.

For an embodiment where a fixed matrix is used in determining MMSE weights instead of a covariance matrix $\Delta j$, second extrinsic information 229 is not fed back to channel pre-processor block. Thus, feedback circuitry for feeding back second extrinsic information 229 to channel pre-processor block 302, such as in a Wang Demodulator, may be omitted or otherwise avoided. Along those lines, because only covariance matrix $\Delta j$ would have been altered in Equation (5) responsive to such second extrinsic information 229 feedback, the remainder of Equation (5) is unaffected by omission of such feedback.

Weight vector 312 may be used by filter 320 of detection-cancellation block 301 for equalization of symbol vector 227 in order to provide a filter output, namely equalized vector 311. Such equalization or filtering may be performed after an initial soft interference cancellation performed on symbol vector 227 using an initial instance of cancellation vector 313. As described below in additional detail, second extrinsic information 229 is feedback to LLR determination block 304 and to symbol-mean determination block 303. Second extrinsic information 229 is feedback to symbol-mean determination block 303 for iterative refinement of cancellation vector 313 by symbol-mean determination block 303 using such feedback.

In an embodiment, channel pre-processor block 302 may be configured to determine at least one statistics vector 314 associated with equalized vector 311 for providing to LLR determination block 304. Generation of such at least one statistics vector 314 may be part of pre-processing for a subsequent LLR determination by log map 305 of LLR determination block 304. Soft output of filter 320 may be approximated as Gaussian distributed according to Equation (7):

$$p(z_j|x_j) \sim N_c(\mu_j x_j, \eta_j^2) \quad (7)$$

where mean vector, $\mu_j$, may be conditioned on symbol $x_j$ and determined in accordance with Equation (8):

$$\mu_j \triangleq E\{z_j | x_j^*\} = e^T H^H \sqrt{\frac{M_T}{SNR}} \left(H\Delta_j H^H + \frac{M_T}{SNR}I\right)^{-1} He \quad (8)$$

Recognizing similarity of Equations (5) and (8), in an embodiment, channel pre-processor block 302 may optionally be configured to determine an optional mean vector 314B, where covariance matrix, $\Delta j$, is approximated by a fixed matrix, as previously described with reference to determination of weight vector 312. In another embodiment, such fixed matrix used to determine optional mean vector 314B may be an identity matrix, as previously described with reference to determination of weight vector 312. It should be understood that I in Equation (8) is an identity matrix; however, such I identity matrix may be different than an identity matrix used to replace covariance matrix, $\Delta j$. Using similarity of Equations (5) and (8), determined values may be reused for determination of weight vector 312 and optional mean vector 314B to conserve resources. However, in yet another embodiment, optional mean vector 314B may not be determined at all. Rather, mean vector 314B may be set to a value of one, namely mean $\mu_j$ may be set equal to 1 in log map 305. This embodiment reduces resource usage more than using a fixed matrix for determination of optional mean vector 314B. However, in any of these embodiments, usage of circuit resources is reduced, and thus a reduction in power consumption may follow.

As described above, in an embodiment, channel pre-processor block 302 may be configured to determine at least one statistics vector 314 associated with equalized vector 311 for providing to LLR determination block 304. Such at least one statistics vector 314 may include a variance vector, which may be determined as in Equation (9):

$$\eta_j^2 \triangleq \text{var }\{|z_j|^2\} - \mu_j^2 = \mu_j - \mu_j^2 \quad (9)$$

Variance vector, $_j^2$, 314A may be used by log map 305 of LLR determination block 304 to provide first extrinsic information 225 for a corresponding ith binary bit in a symbol $x_j$. In other words, first extrinsic information 225 provided from demodulator 226 to decoder 224 for a (q−1)th iteration of second loop 222 for a bit i in symbol $x_j$ may be determined by log map 305. Use of such (q−1)th iteration is to delineate generation of first extrinsic information 225 prior to feedback of second extrinsic information 229, as will become apparent from the following description.

Log map 305 may be configured according to a first log map configuration or a second log map configuration. For log map 305 configured according to a second log map configuration, log map 305 may have a form as indicated by Equation (10):

$$L_{D\to L}^q(b_i) \triangleq \log \frac{P(b_i = +1 | z_j)}{P(b_i = -1 | z_j)} - \log \frac{P(b_i = +1)}{P(b_i = -1)} = $$

$$\log \frac{E_{x^+ \in S_{i,j}^+} \exp\left(\frac{-\|z_j - \mu_j x^+\|^2}{n_j^2} + \sum_{k=1}^{\log_2|\Omega|} \{x_j^+\}_k \cdot \frac{L_{D\leftarrow L}^{q-1}(b_k)}{2}\right)}{E_{x^+ \in S_{i,j}^-} \exp\left(\frac{-\|z_j - \mu_j x^-\|^2}{n_j^2} + \sum_{k=1}^{\log_2|\Omega|} \{x_j^-\}_k \cdot \frac{L_{D\leftarrow L}^{q-1}(b_k)}{2}\right)} - $$

$$L_{D\leftarrow L}^{q-1}(b_i) \quad (10)$$

In Equation (10), $S^+_{i,j}$ is a set of all possible values of $x_i$ for which an ith coded bit thereof is +1, and $S^-_{i,j}$ is a set of all possible values of $x_i$ for which an ith coded bit thereof is −1. Equation (10) may be referred to as the "Wang Algorithm," as associated with Xiaodong Wang of the above-identified article. In an embodiment, log map 305 may be configured with a first log map configuration which is an approximation of the second log map configuration, where such second log map configuration is configured as indicated by Equation (10) without any approximation as described herein. In other words, log map 305 with a first log map configuration is suboptimal with respect to precision for computing or otherwise determining first extrinsic information 225, but has reduced complexity and thus uses fewer circuit resources than a second log map configuration as in Equation (10). Use of such first log map configuration may translate to use of fewer circuit resources reducing power consumption, as well as cost, in comparison to use of such second log map configuration. In an embodiment using a first log map configuration for log map 305, mean $\mu_j$ may be set equal to one as previously described, which simplifies Equation (10), and thus log map 305 of such first log map configuration embodiment uses fewer circuit resources than log map 305 of such second log map configuration embodiment.

In another embodiment of such first log map configuration for log map 305, a max-log approximation is used as a substitution in the second log map configuration to provide the first log map configuration for log map 305. Equation (11) indicates that a Jacobian logarithm expression may be approximated by a max term thereof:

$$\log(\Sigma_{i=1}^N \exp(\alpha_i)) = \max(\alpha_i) + f(\alpha_1, \alpha_2, \ldots \alpha_N) \approx \max(\alpha_i) \quad (11)$$

Briefly, it is known to use a Jacobian logarithm substitution for a log sum of exponentials. However, even using such Jacobian logarithm substitution in Equation (10) would still yield a substantially complex configuration. Contrastingly, by approximating a log sum of exponentials with a max term thereof to provide a max-log approximation of Equation (10), a substantial reduction in complexity of Equation (10) may be attained. Using such max-log approximation (e.g., max($a_i$) in Equation (11)), Equation (10) may be approximated, and likewise substantially reduced in complexity, as indicated in Equation (12):

$$L_{D \to L}^q(b_i) \approx \frac{1}{2} \max_{x^+ \in S_{i,j}^+} \left( \frac{-\|z_j - \mu_j x^+\|^2}{n_j^2} + \sum_{k=1}^{\log_2|\Omega|} \{x_j^+\}_k \cdot \frac{L_{D \leftarrow L}^{q-1}(b_k)}{2} \right) - \quad (12)$$

$$\frac{1}{2} \max_{x^+ \in S_{i,j}^+} \left( \frac{-\|z_j - \mu_j x^-\|^2}{n_j^2} + \sum_{k=1}^{\log_2|\Omega|} \{x_j^-\}_k \cdot \frac{L_{D \leftarrow L}^{q-1}(b_k)}{2} \right) -$$

$$L_{D \leftarrow L}^{q-1}(b_i)$$

In Equation (12), mean $\mu_j$ may or may not be set equal to one as previously described to provide log map 305 configured with a first log map configuration. Equation (12) indicates that first extrinsic information 225 for a qth iteration of second loop 222 for an ith coded bit of a symbol $x_j$ may be refined in determination of such first extrinsic information by using second extrinsic information 229 of a (q−1)th iteration of second loop 222. An LLR for an ith coded bit of a symbol $x_j$ may be determined responsive to a variance vector 314A, second extrinsic information 229, and equalized vector 311, where equalized vector 311 includes such ith coded bit. First extrinsic information 225 for this embodiment is first LLRs of coded bits of such equalized vector 311 after MMSE demodulation by demodulator 226, and second extrinsic information 229 for this embodiment is second LLRs of such coded bits after decoding by decoder 224.

Reduced computational complexity of such second log map configuration to provide a first log map configuration translates into use of fewer circuit resources, which may reduce power consumption. Likewise, use of fewer circuit resources may reduce cost, including in selection of a PLD with programmable resources for an application. Generally, computational complexity of such second log map configuration for Equation (10) may be on the order of $O(|\Omega|)^M$ for M a number of transmission antennas, whereas computational complexity of a first log map configuration for Equation (12) may be on the order of $O(|\Omega|)^3$. The "O" is used to designate order of complexity.

Another approximation of such second log map configuration or another embodiment of such first log map configuration may be by approximating L2-Norms in Equation (10) or (12), respectively. In Equation (10) and Equation (12), for mean $\mu_j$ assigned to unity to reduce multiplicative complexity, the square of absolute values for $x^+$ and $x^-$ terms are "L2-Norms" or $l^2$-norms. Such L2-Norms may respectively be replaced with "L1-Norms" or $l^1$-norms. Equation (13) is a general mathematical expression for an L1-Norm for a complex number $e_i$:

$$l^1 \text{norm: } |e_i| = |\Re\{e_i\}| + |\Im\{e_i\}| \quad (13)$$

For purposes of clarity by way of example and not limitation, with Equation (10) max-log approximated with Equation (12), Equation (12) approximated using L1-Norms and mean $\mu_j$ assigned to unity, and MMSE weights approximated using a covariance matrix assigned to an identity matrix for equalization of equalized vector 311, approximately a 0.5 db loss in performance may result in comparison to a non-approximated version of the Wang Algorithm and non-approximated MMSE weights for three iterations of second loop 222 of a Turbo equalizer 235 for MMSE-SIC. The above example of performance loss was based on 8 transmission antennas and a constellation size of 64 for QAM-64. It should be understood that even though the example of QAM is used, other types of modulation may be used including without limitation pulse amplitude modulation ("PAM") and phase-shift keying ("PSK"), among others. The amount resources saved as a percentage of resources that would have been used for a non-approximated implementation of the Wang Algorithm and non-approximated MMSE weights may depend on the number of transmission antennas, the constellation size, and/or the number of iterations of second loop 222. Generally, the percentage of resources saved may be in a range of approximately 15 to 55 percent, where more savings may generally be obtained with more iterations of second loop 222, which savings tends to flatten out after a significant number of iterations of second loop 222. However, for a small loss in performance, a substantial savings in circuit resources may be realized.

LLRs output from LLR determination block 304 as provided from log map 305 with an embodiment of a first log map configuration are provided as first extrinsic information 225 to decoder 224. Decoder 224 iteratively processes such first extrinsic information 225 around a first loop 221, namely an inner decoding loop, to provide second extrinsic information 229. Second extrinsic information 229 may be provided as feedback to log map 305 of LLR determination block 304 and to symbol-mean determination block 303 for a subsequent iteration of second loop 222. After one or more iterations around second loop 222, decoder 224 may output detected-decoded bits 223. More particularly, such detected-decoded bits 223 may be what is referred to as "hard decisions," namely assigned states based upon estimates, including without limitation iteratively refined estimates. Accordingly, a reduce complexity Turbo equalizer for MMSE-SIC has been described.

Figure 4:
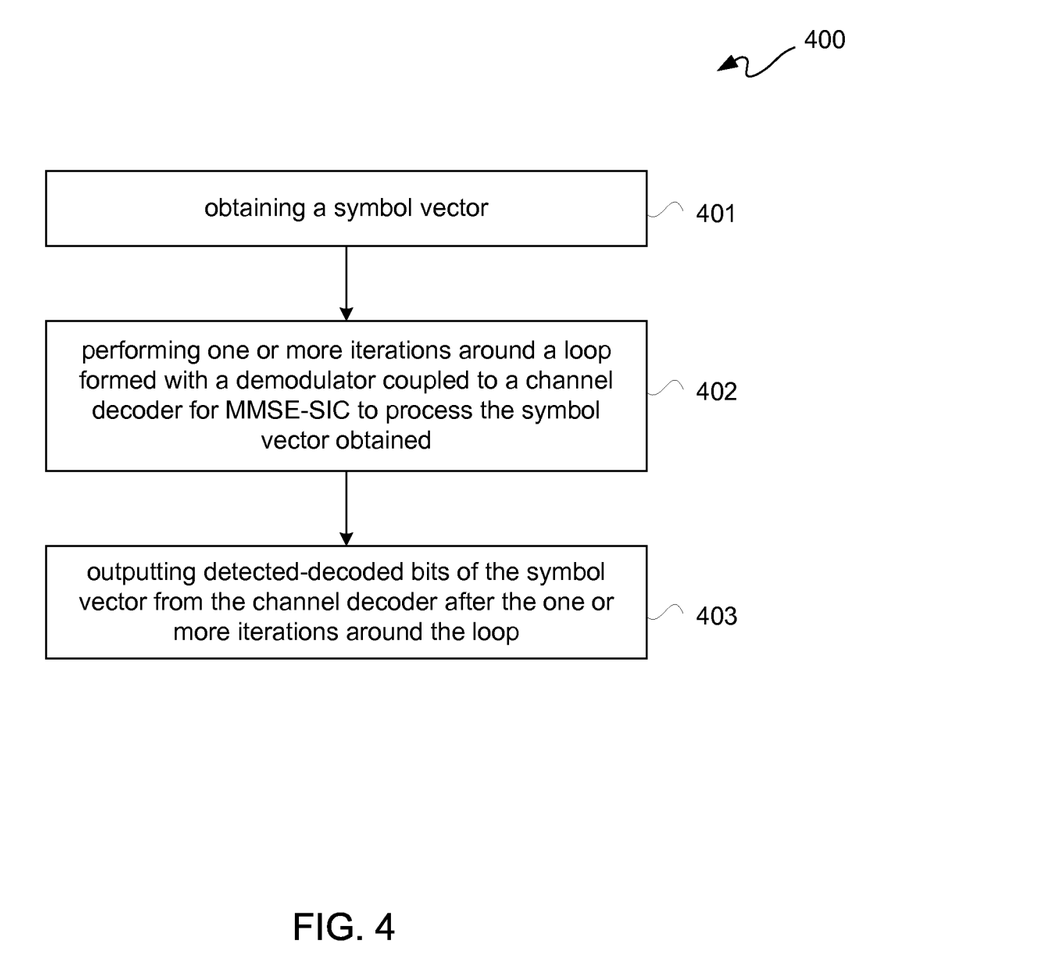
FIG. 4 is a flow diagram depicting an exemplary embodiment of an equalizer operational flow.

FIG. 4 is a flow diagram depicting an exemplary embodiment of an equalizer operational flow 400. Equalizer operational flow 400 may be for equalizer 235 as described with reference to FIGS. 2 and 3. Equalizer operational flow 400 is further described with simultaneous reference to FIGS. 2, 3, and 4.

At 401, a symbol vector, such as symbol vector 227, is obtained via a plurality of antennas, such as antenna array 204. At 402, one or more iterations around an outer loop, such as second loop 222, is performed with a demodulator, such as demodulator 226, configured for MMSE-SIC as coupled to a channel decoder, such as decoder 224, to process such symbol vector obtained at 401. At 403, hard decisions, such as detected-decoded bits 223, may be output from decoder 224 to provide detected-decoded bits 223 of such symbol vector 227 after such one or more iterations.

Figure 5:
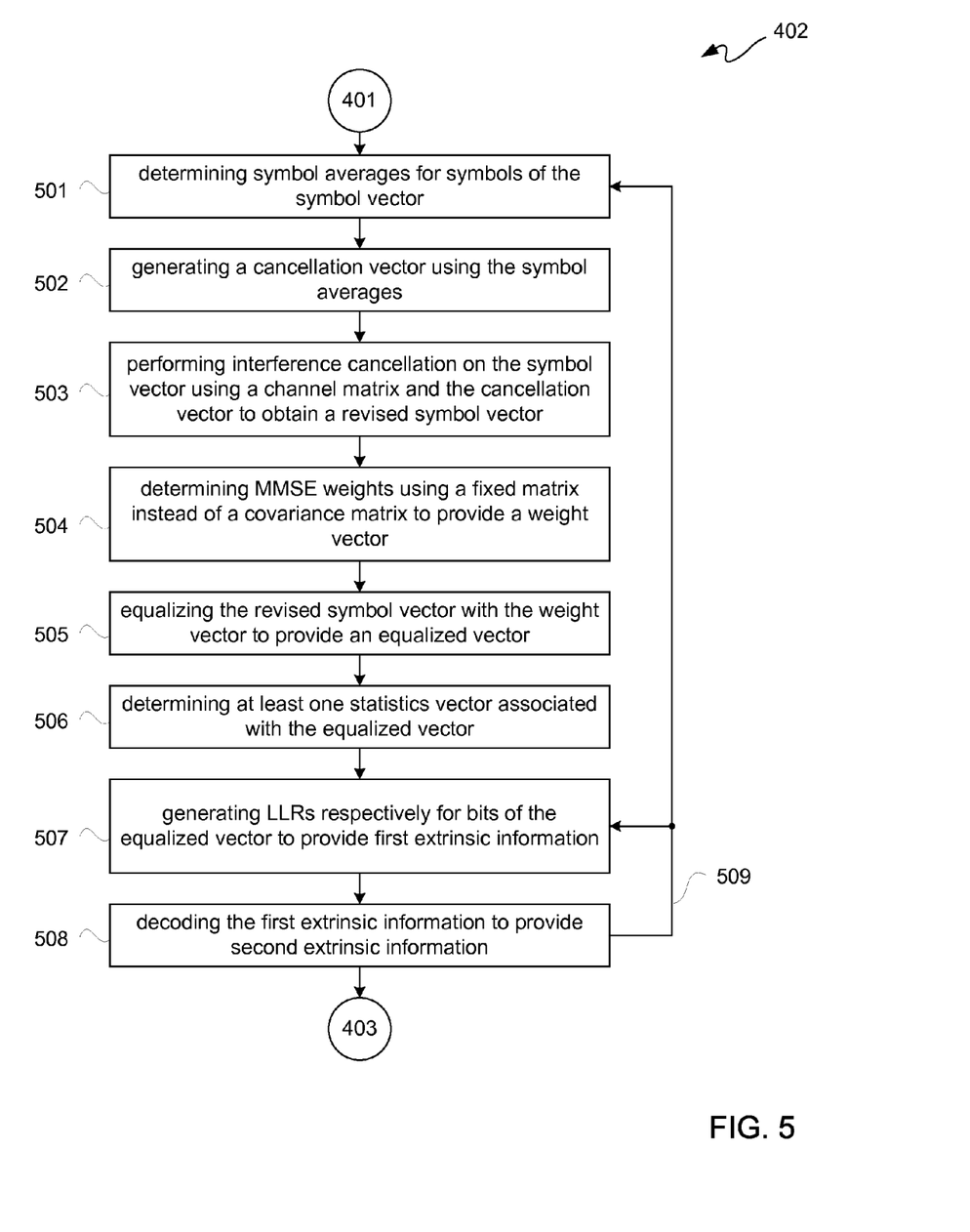
FIG. 5 is a flow diagram depicting an exemplary embodiment of sub-operations performed for an operation of FIG. 4 for an initial iteration around an outer loop for a demodulating-decoding iterative sequence.

FIG. 5 is a flow diagram depicting an exemplary embodiment of sub-operations performed for operation 402 of FIG. 4 for an initial iteration around an outer loop, such as second loop 222, for a demodulating-decoding iterative sequence. Such sub-operations are described in additional detail with simultaneous reference to FIGS. 2 through 5. From 401, at 501, symbol averages of symbols in a symbol vector, such as a symbol vector 227, are determined. At 502, a cancellation vector, such as cancellation vector 313, is generated using such symbol averages. At 503, interference cancellation is performed on such symbol vector 227 using a channel matrix H and such cancellation vector 313 to obtain a revised symbol vector, where such revised symbol vector may be initial vector output 321.

At 504, MMSE weights are determined using a fixed matrix instead of a covariance matrix to provide a weight vector, such as weight vector 312. At 505, such revised symbol vector is equalized with such weight vector to provide an equalized vector, such as equalized vector 311. At 506, at least one statistics vector, such as at least one statistics vector 314, as associated with such equalized vector is determined. At 507, LLRs are respectively generated for bits of such equalized vector to provide first extrinsic information, such as first extrinsic information 225. At 508, such first extrinsic information is decoded, such as by decoder 224, to provide second extrinsic information, such as second extrinsic information 229. After sub-operation 508, operation 402 may proceed to operation 403 provided, however, a sufficient number of iterations around an outer loop of an equalizer, such as second loop 222 of equalizer 235, have been performed.

A subsequent iteration to an initial or previous iteration around such an outer loop of such an equalizer may begin at 509, where such second extrinsic information may be fed back at 501 and at 507. For purposes of clarity and not limitation, no counting of iterations is illustratively depicted; however, it should be understood that a counter may be used to count iterations around an outer loop, such as second loop 222.

Responsive to such feedback of such second extrinsic information, at 501 symbol averages may be re-determined for symbols of such symbol vector, where such symbol averages are refined using such second extrinsic information. Likewise, at 507, LLRs may be re-generated respectively for bits of such equalized vector using such second extrinsic information to provide a refined version of such first extrinsic information. Thus, for such a subsequent iteration around such an outer loop of such an equalizer, each of sub-operations 501 through 508 may be repeated, but with sub-operations 501 and 507 using such second extrinsic information fed back from a decoding sub-operation at 508 from an immediately prior iteration. Iterations around such outer loop of such equalizer subsequent to an initial iteration may be for one or more repetitions of sub-operations 501 through 508 for iteratively refining first extrinsic information 225 using second extrinsic information 229 from an immediately prior iteration. Thus, repeating sub-operations with feedback of second extrinsic information 229 may include re-determining symbol averages at 501 using such second extrinsic information 229 fed back, and re-generating first extrinsic information 225 at 507 for refinement thereof responsive to such second extrinsic information 229 fed back.

As previously described, such fixed matrix at 504 may optionally be an identity matrix. Furthermore, such at least one statistics vector determined at 506 may be a variance vector, such as a variance vector 314A. Optionally, generation at 507 may approximate such LLRs using a max-log approximation to provide such first extrinsic information. Optionally, at 507, such LLRs may be approximated using a respective L1-Norm for each L2-Norm in a log map to provide such first extrinsic information. Optionally, at 507, such LLRs may be approximated by setting a mean associated with such equalized vector to a value of one in such log map.

Those skilled in the art will appreciate that one or more embodiments hereof may be implemented in hardware, software, or a combination of hardware and software. Such implementations may include a number of processors or processor cores independently and/or dependently executing various programs or scripts, which may include use of dedicated hardware or programmable hardware. With respect to operations performed in whole or in part in software, such operations, such as those performed by demodulator 226 or decoder 224, may be executed using for example one or more processor cores coupled to one or more storage devices, including without limitation one or more memory arrays. Such a processor core may be a type of microprocessor, such as available from IBM, Intel, ARM, and AMD for example. Such processor cores, including without limitation one or more embedded processor cores, and such one or more memory arrays may be on a same or separate die from one another, and/or may be on a same or separate die as dedicated and/or programmable hardware. Memory coupled to such processor core may include random access memory, read only memory, flash memory, cache memory, or the like, as well as non-transitory signal-bearing media. Such memory may store all or portions of one or more programs and/or data to implement one or more of the operations described in accordance with one or more embodiments hereof to provide a program product.

One or more program(s) or script(s) of the program product, as well as documents thereof, may define functions of embodiments hereof and can be contained on a variety of non-transitory signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or hard-disk drive or read/writable CD or read/writable DVD). The above embodiments specifically include information downloaded from the Internet and other networks.

While the foregoing describes exemplary embodiments in accordance with one or more aspects of the invention, other and further embodiments in accordance with the one or more aspects of the invention may be devised without departing from the scope thereof, which is determined by the claims that follow and equivalents thereof. Claims listing steps do not imply any order of the steps. Trademarks are the property of their respective owners.

What is claimed is:

1. An equalizer, comprising:
a demodulator to receive a symbol vector;
wherein the demodulator is for minimum mean-square-error successive-interference-cancellation ("MMSE-SIC") to provide first information;
a decoder to receive the first information to provide second information to the demodulator;
wherein the decoder includes a first loop for internally iteratively processing the first information to provide the second information as a refined estimate of the first information;
wherein the demodulator and the decoder are coupled to provide a second loop for feeding back the second information for iteratively refining the first information; and
wherein the demodulator includes:
a detection-cancellation block to receive the symbol vector to provide an equalized vector;
a channel pre-processor block to receive an initial vector output of the detection-cancellation block for the symbol vector for a demodulating-decoding iterative sequence to provide a weight vector;
wherein the channel pre-processor block provides an approximation using a fixed matrix to generate the weight vector; and
wherein the detection-cancellation block receives the weight vector for equalization of the symbol vector in order to provide the equalized vector.

2. The equalizer according to claim 1, wherein:
the demodulator further includes a log-likelihood-ratio ("LLR") determination block to receive the equalized vector;

the channel pre-processor block provides a variance vector associated with the equalized vector and a mean vector associated with the equalized vector;
wherein the weight vector is static for the demodulating-decoding iterative sequence;
the fixed matrix is an identity matrix; and
the LLR determination block receives the variance vector and the mean vector.

3. The equalizer according to claim 1, wherein:
the demodulator further includes a log-likelihood-ratio ("LLR") determination block to receive the equalized vector;
the channel pre-processor block is further to provide a variance vector for the equalized vector;
the fixed matrix is an identity matrix;
wherein the weight vector is static for the demodulating-decoding iterative sequence;
the LLR determination block receives the variance vector; and
the LLR determination block replaces a mean vector for the equalized vector with a value of one.

4. The equalizer according to claim 3, wherein:
the demodulator further includes a symbol-mean determination block;
each of the symbol-mean determination block and the LLR determination block receives the second information; and
the symbol-mean determination block provides symbol averages of symbols of the symbol vector to provide a cancellation vector to the detection-cancellation block.

5. The equalizer according to claim 4, wherein:
the demodulator is an MMSE demodulator;
the decoder is a Turbo decoder;
the LLR determination block generates the first information responsive to the variance vector, the second information, and the equalized vector;
wherein the first information is first log-likelihood-ratios ("LLRs") of bits after demodulation by the demodulator;
wherein the second information is second LLRs of the bits after decoding by the decoder; and
wherein the detection-cancellation block is a multiple-input-multiple-output ("MIMO") detection-cancellation block.

6. The equalizer according to claim 1, wherein:
the demodulator further includes a log-likelihood-ratio ("LLR") determination block to receive the equalized vector; and
the LLR determination block has a log map to provide an approximation of a Wang Algorithm.

7. An equalizer, comprising:
a demodulator to receive a symbol vector;
wherein the demodulator is for minimum mean-square-error successive-interference-cancellation ("MMSE-SIC") to provide first extrinsic information;
a decoder to receive the first extrinsic information to provide second extrinsic information to the demodulator;
wherein the decoder includes a first loop for internally iteratively processing the first extrinsic information to provide the second extrinsic information as a refined estimate of the first extrinsic information;
wherein the demodulator and the decoder are coupled to provide a second loop for iteratively feeding back the second extrinsic information for refining the first extrinsic information;
wherein the demodulator includes a log-likelihood-ratio ("LLR") determination block to receive an equalized vector to provide the first extrinsic information; and
wherein the LLR determination block has a log map to provide an approximation of a Wang Algorithm.

8. The equalizer according to claim 7, wherein the approximation is of LLRs of bits of the equalized vector and is provided with a max-log approximation of a Wang Algorithm.

9. The equalizer according to claim 8, wherein the LLR determination block is configured with an L1-Norm corresponding replacement for each L2-Norm in the Wang Algorithm.

10. The equalizer according to claim 7, wherein the LLR determination block is configured to provide the approximation by having:
a mean associated with the equalized vector in the log map set to a value of one;
a max-log approximation of the Wang Algorithm to provide the log map; and
an L1-Norm corresponding replacement for each L2-Norm in the Wang Algorithm to provide the log map.

11. The equalizer according to claim 10, wherein the demodulator further includes:
a detection-cancellation block to receive the symbol vector to provide the equalized vector;
a channel pre-processor block to receive an initial output of the detection-cancellation block associated with the symbol vector for a demodulating-decoding iterative sequence to provide a weight vector;
wherein the channel pre-processor block approximates a covariance matrix by substitution therefor with a fixed matrix to generate the weight vector; and
wherein the detection-cancellation block receives the weight vector for equalization of the symbol vector to provide the equalized vector.

12. The equalizer according to claim 11, wherein:
the channel pre-processor block is further to provide a variance vector associated with the equalized vector;
the fixed matrix is an identity matrix; and
the LLR determination block receives the variance vector.

13. The equalizer according to claim 12, wherein:
the demodulator further includes a symbol-mean determination block;
each of the symbol-mean determination block and the LLR determination block receives the second extrinsic information as feedback; and
the symbol-mean determination block provides symbol averages of symbols of the symbol vector to provide a cancellation vector to the detection-cancellation block.

14. The equalizer according to claim 13, wherein:
the LLR determination block generates the first extrinsic information responsive to the variance vector, the second extrinsic information, and the equalized vector;
the mean is set to a value of one;
the detection-cancellation block is a multiple-input-multiple-output ("MIMO") detection-cancellation block; and
the second extrinsic information is not fed back to the channel pre-processor block.

15. A method for operation of an equalizer, comprising:
obtaining a symbol vector; and
performing one or more iterations around a loop formed with a demodulator for minimum mean-square-error successive-interference-cancellation ("MMSE-SIC") coupled to a decoder to process the symbol vector obtained; and outputting detected-decoded bits of the symbol vector from the decoder after the one or more iterations for the MMSE-SIC;

wherein an initial iteration around the loop for a demodulating-decoding iterative sequence includes:
  determining symbol averages for symbols of the symbol vector;
  generating a cancellation vector using the symbol averages;
  performing interference cancellation on the symbol vector using a channel matrix and the cancellation vector to obtain a revised symbol vector;
  determining MMSE weights using a fixed matrix to provide a weight vector; and
  equalizing the revised symbol vector with the weight vector to provide an equalized vector.

16. The method according to claim 15, further comprising:
  determining at least one statistics vector associated with the equalized vector;
  generating log-likelihood ratios ("LLRs") respectively for bits of the equalized vector to provide first extrinsic information;
  decoding the first extrinsic information to provide second extrinsic information; and
  initiating a subsequent iteration around the loop for the demodulating-decoding iterative sequence including:
  repeating steps of the initial iteration with feedback of the second extrinsic information for re-determining the symbol averages and re-generating of the first extrinsic information each of which is refined responsive to the second extrinsic information fed back.

17. The method according to claim 16, wherein:
  the fixed matrix is an identity matrix;
  the at least one statistics vector is a variance vector.

18. The method according to claim 16, wherein the generating of the first extrinsic information includes approximating the LLRs for the bits of the equalized vector using a max-log approximation.

19. The method according to claim 16, wherein the generating of the first extrinsic information includes approximating the LLRs by using a respective L1-Norm for each L2-Norm in a log map.

20. The method according to claim 16, wherein the generating of the first extrinsic information includes approximating the LLRs by setting a mean associated with the equalized vector in a log map to a value of one.

* * * * *